Figure 1:
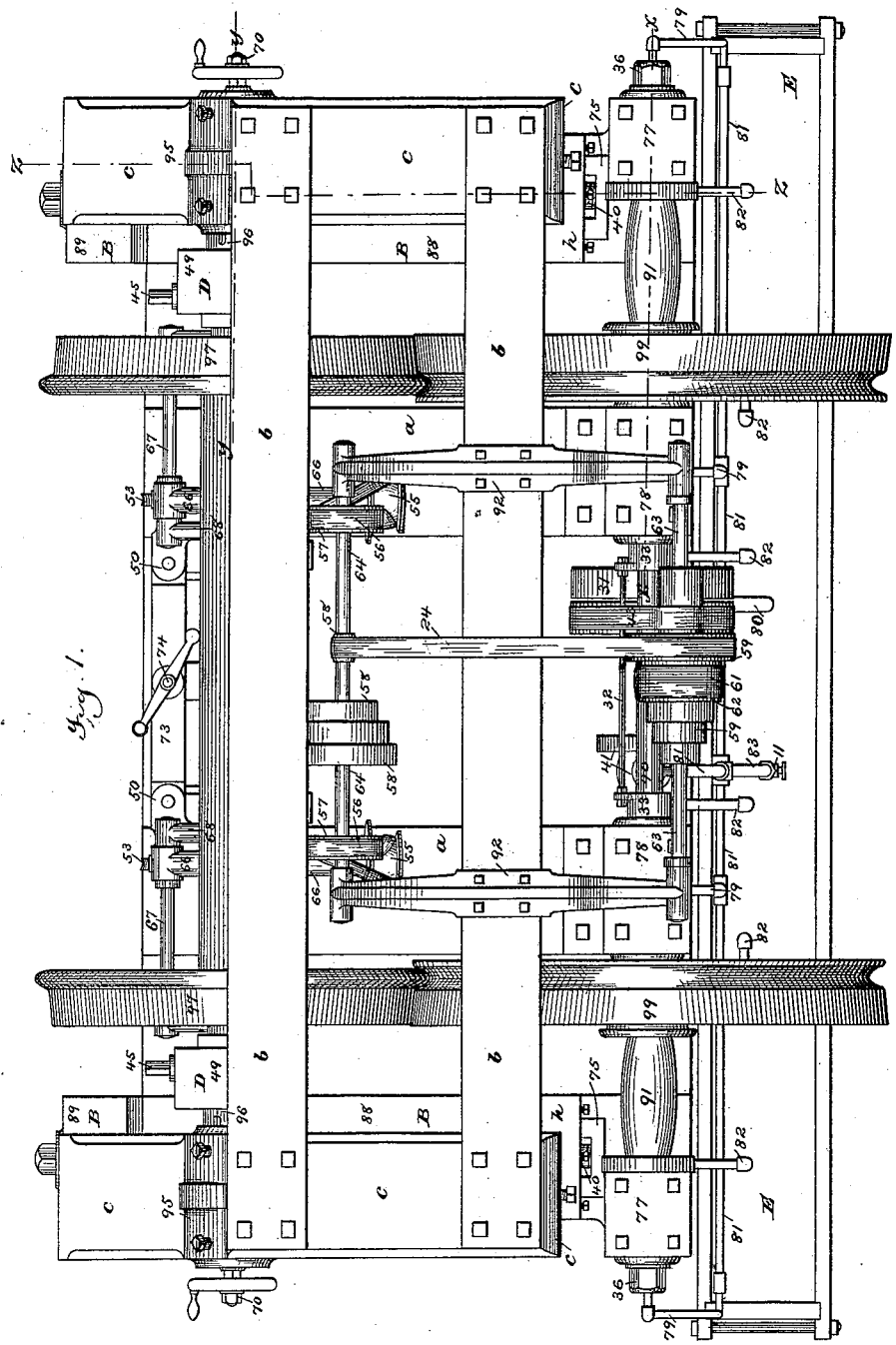

(No Model.) 8 Sheets—Sheet 1.
G. W. MILTIMORE.
ART OF DRESSING AND HARDENING METAL SURFACES.

No. 347,948. Patented Aug. 24, 1886.

(No Model.) 8 Sheets—Sheet 2.

G. W. MILTIMORE.
ART OF DRESSING AND HARDENING METAL SURFACES.

No. 347,948. Patented Aug. 24, 1886.

Attest:
Geo. H. Botts.
J. A. Hovey.

Inventor:
George W. Miltimore
by
Munson & Philipp
Attys.

(No Model.) 8 Sheets—Sheet 3.
G. W. MILTIMORE.
ART OF DRESSING AND HARDENING METAL SURFACES.
No. 347,948. Patented Aug. 24, 1886.
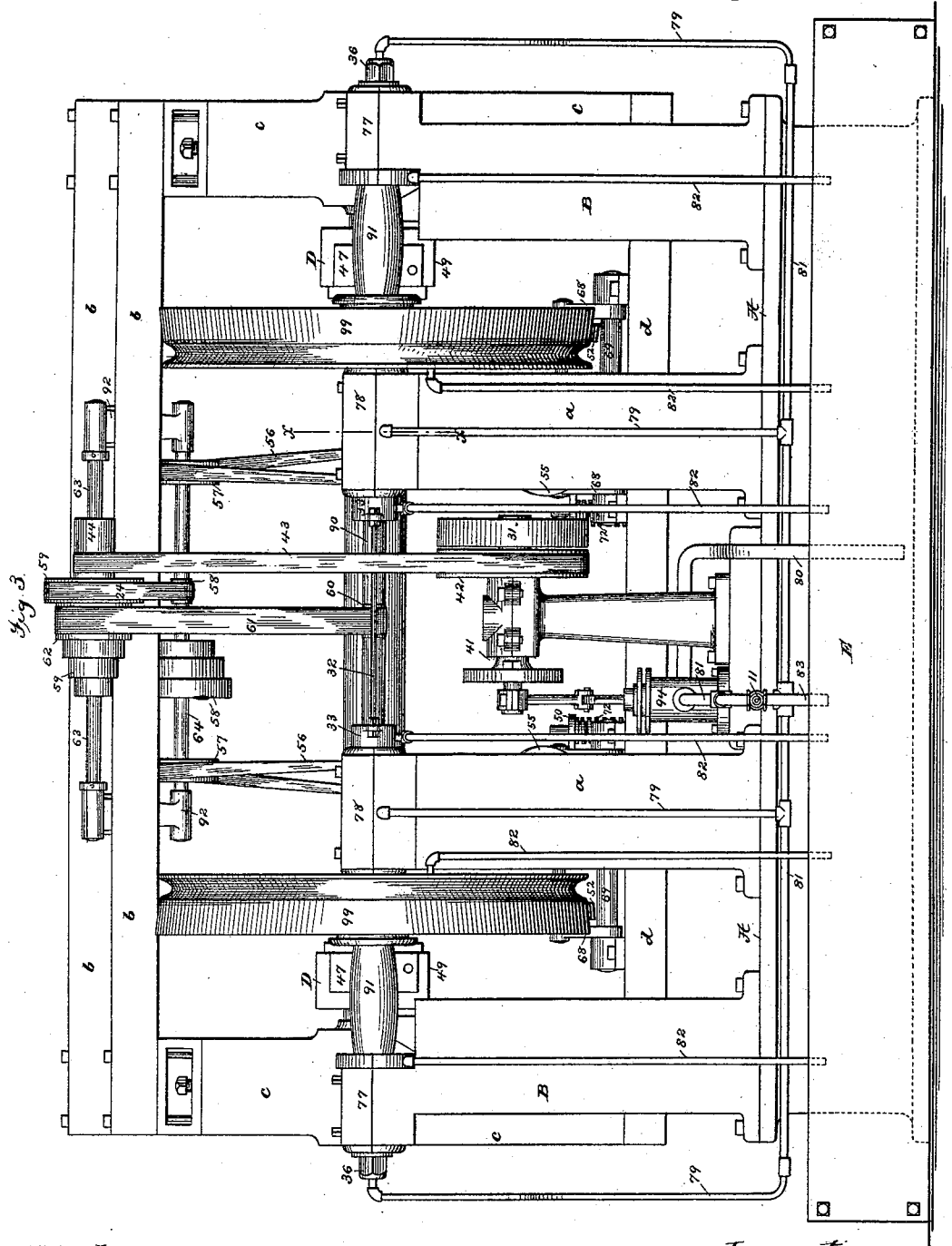

(No Model.)  8 Sheets—Sheet 4.
G. W. MILTIMORE.
ART OF DRESSING AND HARDENING METAL SURFACES.
No. 347,948.  Patented Aug. 24, 1886.
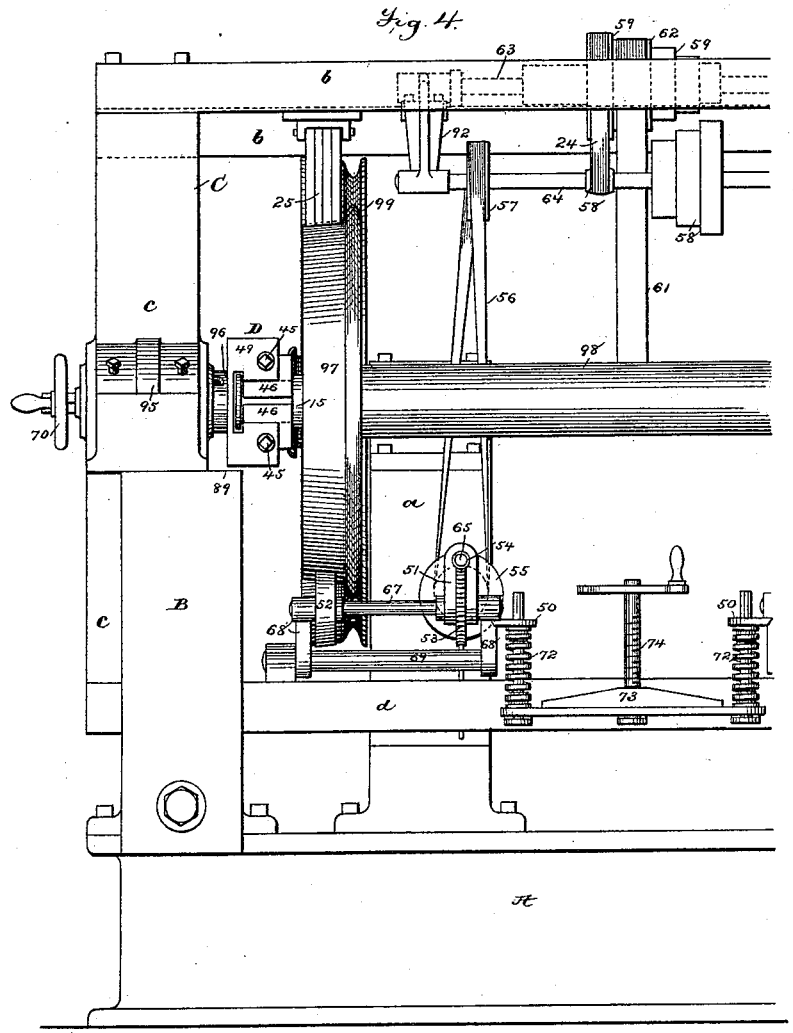
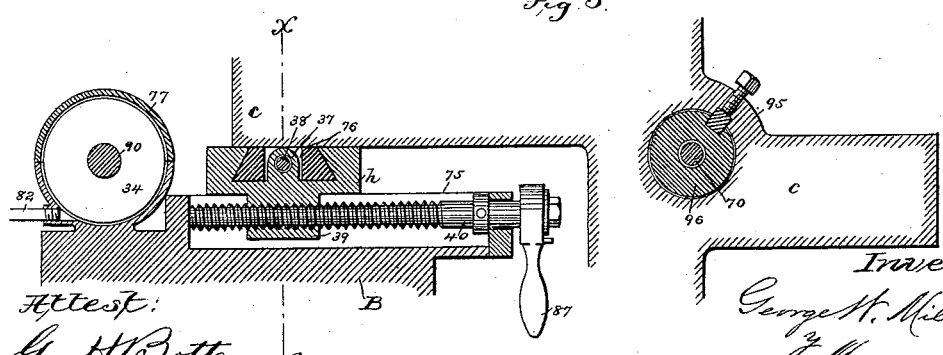

(No Model.) 8 Sheets—Sheet 5.
G. W. MILTIMORE.
ART OF DRESSING AND HARDENING METAL SURFACES.
No. 347,948. Patented Aug. 24, 1886.
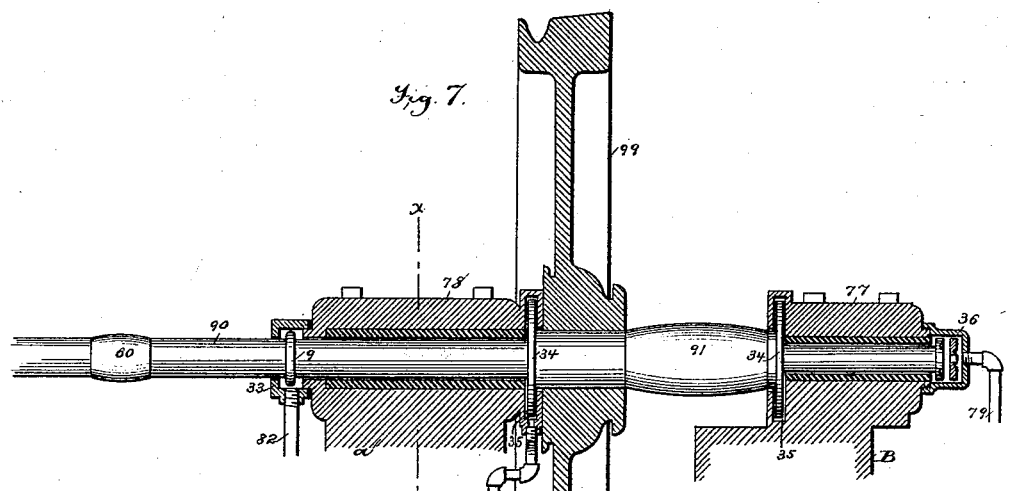
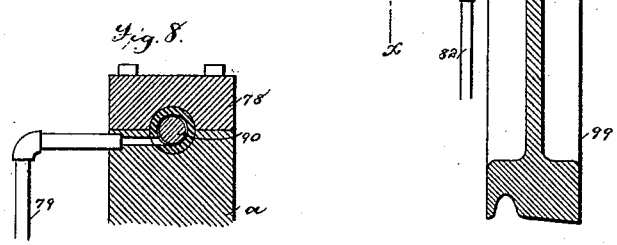
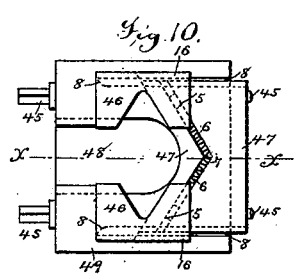
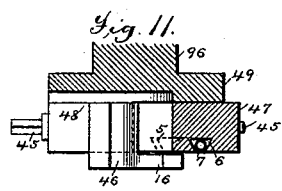
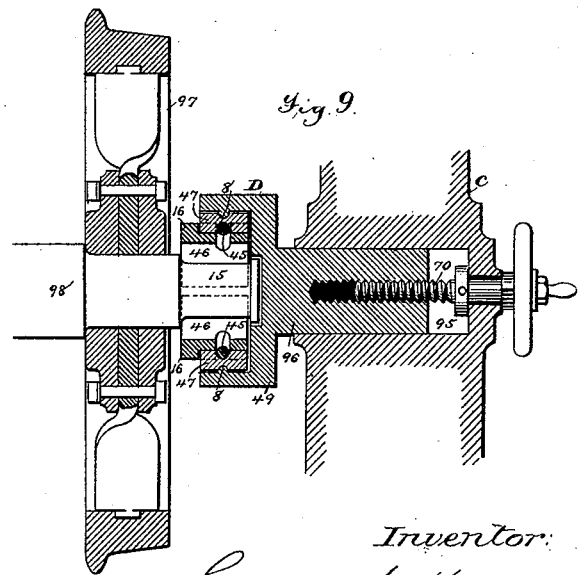

(No Model.) 8 Sheets—Sheet 6.
G. W. MILTIMORE.
ART OF DRESSING AND HARDENING METAL SURFACES.
No. 347,948. Patented Aug. 24, 1886.
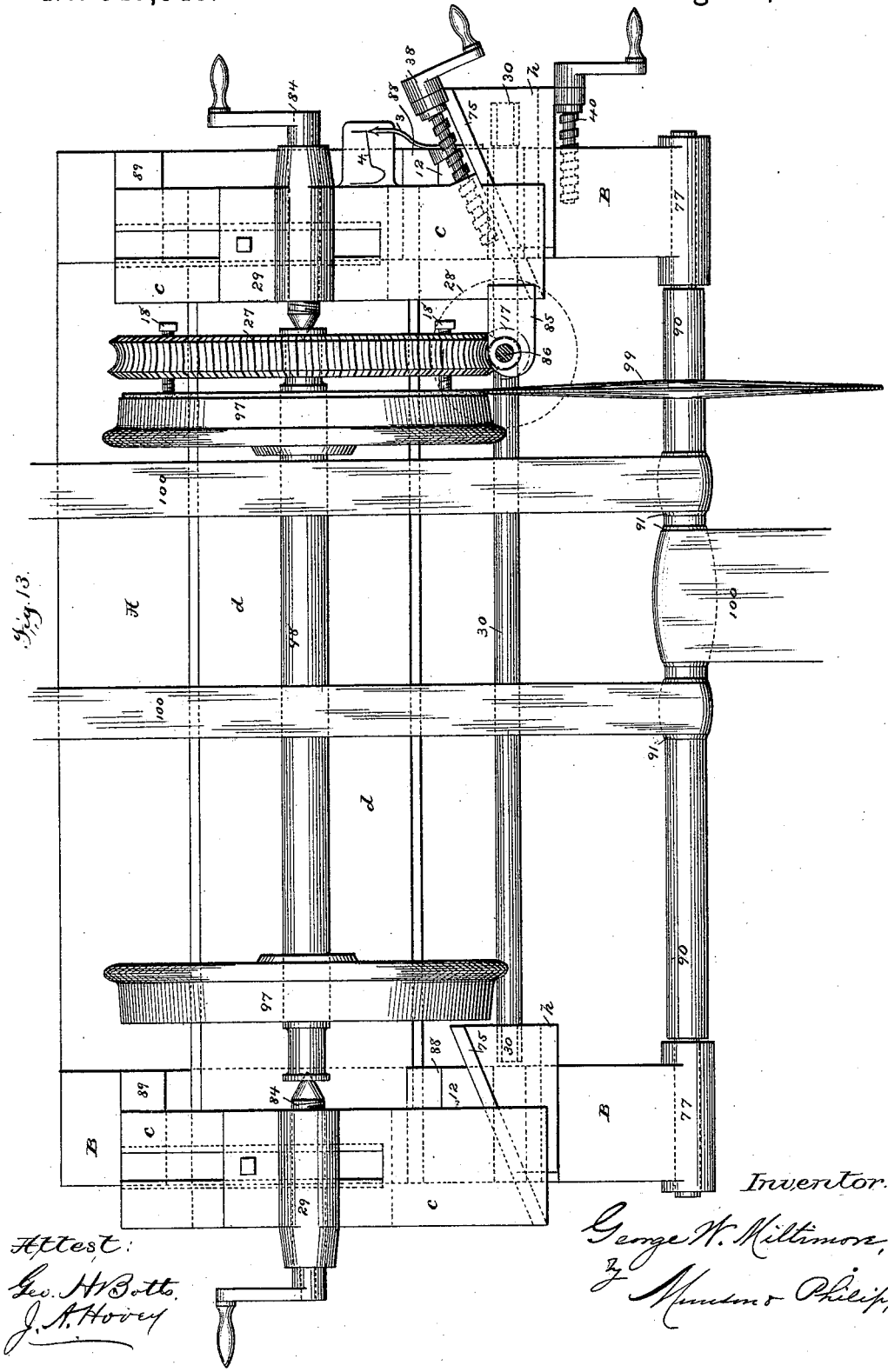

(No Model.) 8 Sheets—Sheet 7.
G. W. MILTIMORE.
ART OF DRESSING AND HARDENING METAL SURFACES.
No. 347,948. Patented Aug. 24, 1886.
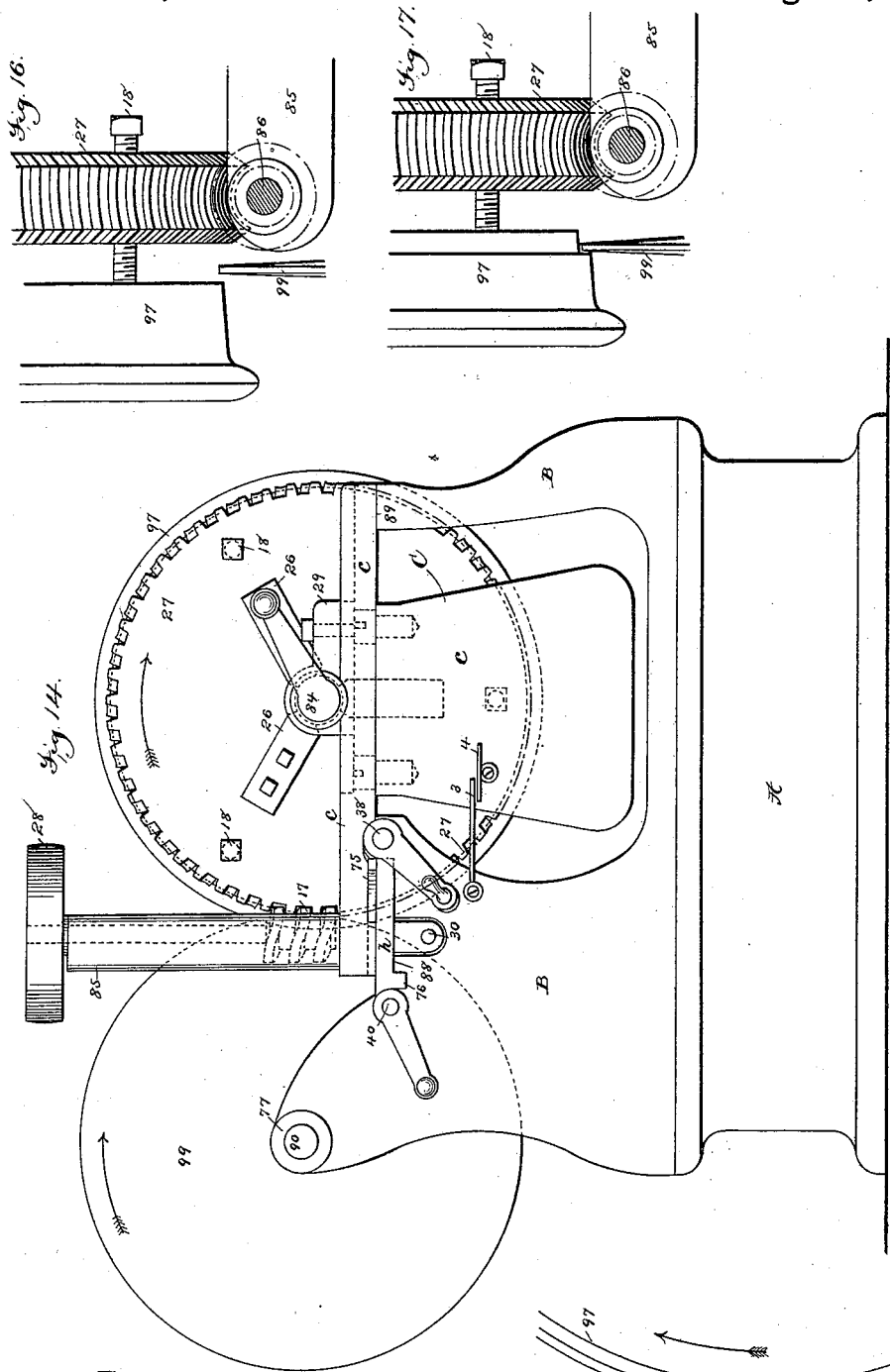

(No Model.) 8 Sheets—Sheet 8.
G. W. MILTIMORE.
ART OF DRESSING AND HARDENING METAL SURFACES.
No. 347,948. Patented Aug. 24, 1886.
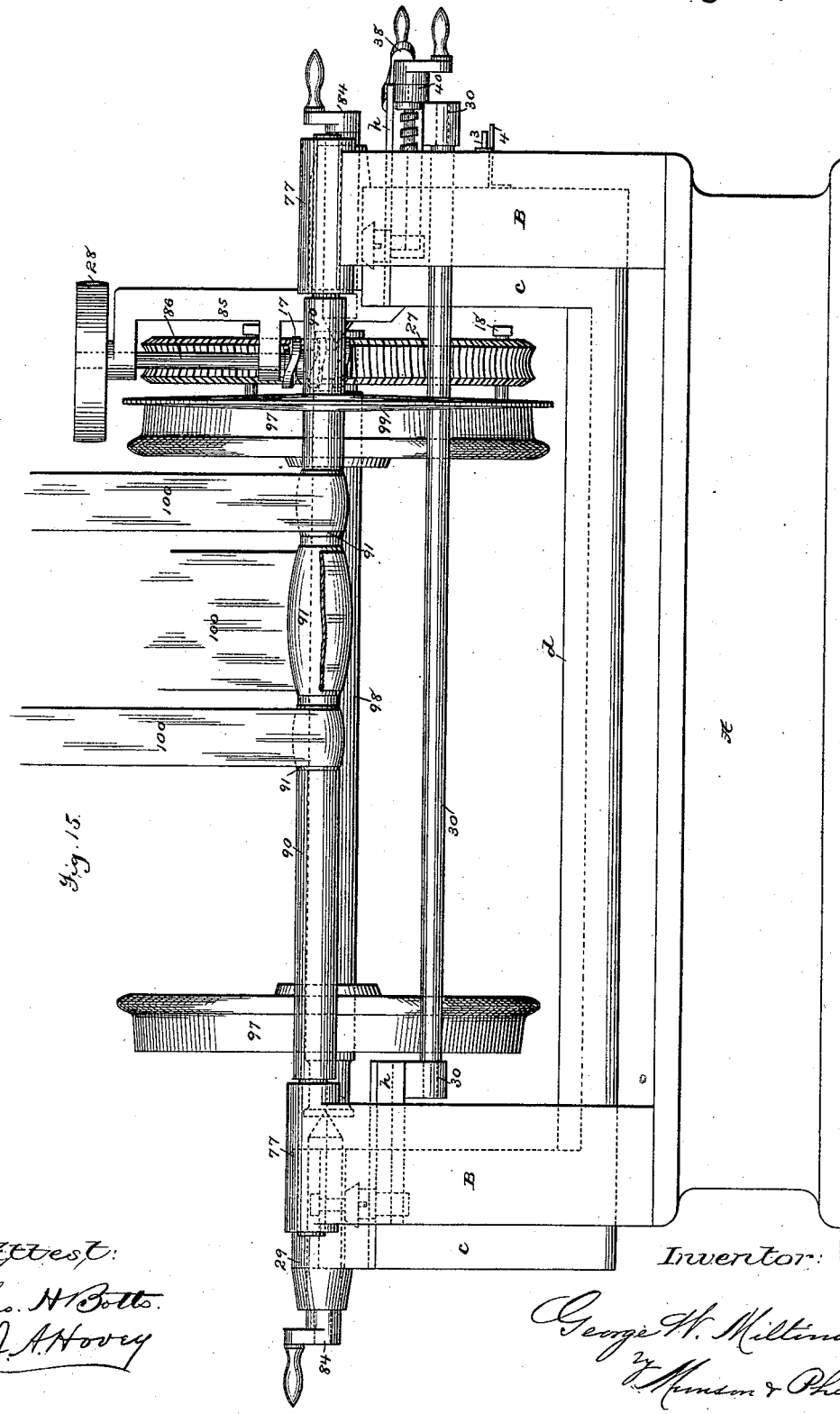

UNITED STATES PATENT OFFICE.

GEORGE W. MILTIMORE, OF ARLINGTON, VT., ASSIGNOR TO THE UNITED STATES CAR WHEEL DRESSING COMPANY, OF CHICAGO, ILL.

ART OF DRESSING AND HARDENING METAL SURFACES.

SPECIFICATION forming part of Letters Patent No. 347,948, dated August 24, 1886.

Application filed February 19, 1886. Serial No. 192,490. (No model.)

*To all whom it may concern:*

Be it known that I, GEORGE W. MILTIMORE, a citizen of the United States, residing at Arlington, county of Bennington, and State of Vermont, have discovered certain new and useful Improvements in the Art of Dressing and Hardening Metal Surfaces, fully described and represented in the following specification and the accompanying drawings, forming a part of the same.

My discovery can be applied to the dressing and hardening of the surfaces of metal bodies generally; but it is more particularly useful in dressing the surfaces of hard-metal bodies, which cannot be readily acted upon by cutting-tools, and in dressing and hardening the surfaces of such soft-metal bodies as cannot, owing to the character of the metal of which they are composed, be hardened by the common processes.

The dressing, planing, turning, smoothing, or removing, for any purpose, of the surfaces of metal bodies has usually been accomplished either by a tool which cut away the surface or by an abrading tool or surface—such, for example, as an emery-wheel—which rubbed against the surface to be dressed or removed, and thus ground or wore it away. When the surface to be dressed is of a soft or comparatively soft nature, as common iron or soft steel, so that it can be readily acted on by a cutting-tool, the dressing or removing of the surface can usually be accomplished by the cutting process without great difficulty or expense. This process does not, however, impart any additional hardness to the dressed surface, and there are many cases where it is exceedingly desirable that the surface or some part of the surface of a body should be much harder than the main part of the metal of which the body is composed, and this it is in many cases impossible to accomplish by the common processes, owing to the character of the metal of which the body is composed. When the surface to be dressed or removed is of a very hard nature, as chilled iron or highly-hardened steel, so that a cutting-tool cannot be made to act upon it at all, or at least not successfully, the dressing has heretofore been accomplished only by the grinding or abrading process, and this process is not only very slow and troublesome, but is so expensive as in many cases to be wholly impracticable.

I have discovered that the dressing, planing, turning, or removing of the surfaces of metal bodies, even when said surfaces are of the hardest character, as chilled iron or highly-hardened steel, can be successfully, economically, and rapidly accomplished by passing the surface to be acted upon in close proximity to the edge or periphery of a rapidly-revolving smooth metal wheel or disk. By this means when the disk is revolved with great rapidity the body acted upon can be burned and melted away to any desired depth, leaving a perfectly smooth and even surface of high finish, and this will be accomplished without perceptible wear upon the revolving disk and without its becoming heated to any considerable extent, and also without heating the body which is being dressed to any considerable extent, except at the immediate point acted upon. I have also discovered that when bodies made of soft or comparatively soft steel, or of ordinary cast or wrought iron, are dressed in this manner the dressed surface may be rendered exceedingly hard. I have also discovered that in operating in this manner upon chilled iron, not only will the chill remain unimpaired, but additional hardness will be imparted to the dressed surface. I have also discovered that highly-hardened steel may be dressed in this manner without drawing the temper, and in such case additional hardness may be imparted to the dressed surface.

As a full understanding of my discovery can be best given by a description of the manner in which it may be applied to practical use, I will, referring to the accompanying drawings, describe two of the many ways in which it may be so applied. The applications selected for the purpose of illustration in the present case are the dressing of car-wheels, this being among the most important and valuable of the uses to which the discovery can be applied.

The accompanying drawings illustrate two mechanisms for practically applying my discovery to the dressing of car-wheels.

Figure 2:
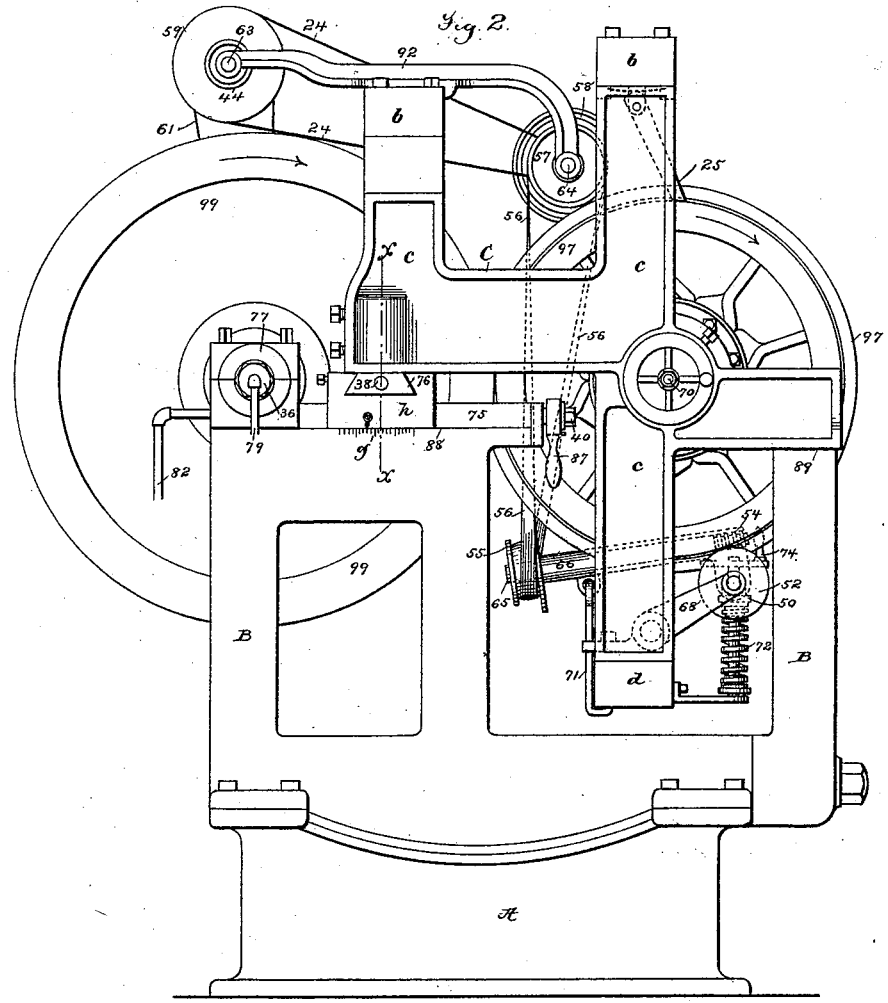
Figure 6:
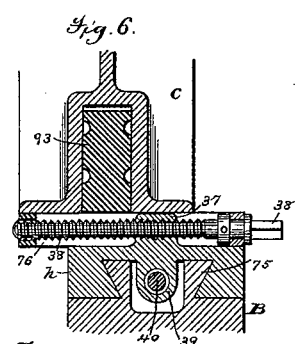
Figure 12:
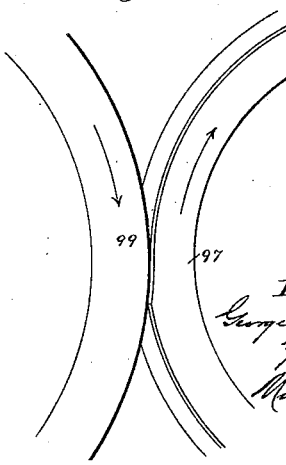

Figure 1 is a plan view of a mechanism for dressing the treads and flanges of car-wheels. Fig. 2 is an end elevation of the same, looking from the right of Fig. 1. Fig. 3 is a side elevation of the same, looking from the left of Fig. 2. Fig. 4 is a partial side elevation of the same, looking from the right of Fig. 2. Fig. 5 is an enlarged section taken upon the line $z\ z$ of Fig. 1. Fig. 6 is a similar view upon a like scale taken upon the line $x\ x$ of Figs. 2 and 5. Fig. 7 is an enlarged section taken upon the line $x\ x$ of Fig. 1. Fig. 8 is a cross-section upon a like scale taken upon the line $x\ x$ of Figs. 3 and 7. Fig. 9 is an enlarged section taken upon the line $y\ y$ of Fig. 1. Fig. 10 is an inside view of one of the chucks or bearings which support the axle upon which the wheels are fixed. Fig. 11 is a horizontal section of the chuck, taken on the line $x\ x$ of Fig. 10. Fig. 12 is a partial side elevation of one of the wheels and disks, illustrating the dressing operation. Fig. 13 is a plan view of a mechanism organized upon a different plan for dressing the treads of car-wheels. Fig. 14 is an end elevation of the same, looking from the right of Fig. 13. Fig. 15 is a side elevation of the same, looking from the left of Fig. 14; and Figs. 16, 17, and 18 are enlarged details illustrating the dressing operation.

Referring now particularly to the mechanism illustrated in Figs. 1 to 11, it is to be understood that A is a base of suitable size and weight to properly support the various parts of the machine. This base is provided at its ends with upright portions B, which are provided at one side of the machine with bearings 77, in which is mounted a shaft, 90, which is provided with two smooth steel disks or wheels, 99. The disks or wheels 99 are made of a fine quality of steel, so as to possess great strength and be capable of being revolved at a very great speed without danger of breaking by reason of their centrifugal force, and are so shaped, as shown, that their edges or peripheries form the counterparts of the treads and flanges of a pair of car-wheels. The shaft 90 is provided just outside the disks 99 with small pulleys or enlargements 91, around which pass belts for transmitting motion to the shaft from any suitable source of power. In order that the disks 99 may be driven at a sufficiently high speed, it is desirable that the shaft 90 and pulleys 91 should be of a comparatively small size, and consequently to prevent the shaft from springing there are provided two upright portions, $a$, which rise from the base A, and afford bearings 78 for the shaft between the disks, thus preventing the shaft from springing and causing the disks to wabble. The upright portions B also support a movable frame-work or carriage, C, composed of end pieces, $c$, which rest upon flat bearings 88 89, formed on the portions B, and are rigidly connected to each other by tie-bars or beams $b\ d$. The end pieces, $c$, of the frame C are provided with bearings 95, in to which fit spindles 96, (see Figs. 5 and 9,) which project inward through the frame-pieces and are provided at their inner ends with chucks D, which are adapted to receive and support the ends 15 of the axle 98 of a pair of car-wheels, 97.

The spindles 96 are splined to the bearings 95, (see Fig. 5,) so as to be prevented from turning therein, and are provided with adjusting-screws 70, by which the chucks can be adjusted to and from each other, so as to receive the ends of axles which vary somewhat in length. The chucks D consist of metal blocks 49, which are provided upon their inner faces with horizontal recesses 48, which are of proper form at one end (see Figs. 4, 10, and 11) to receive the ends 15 of the axle 98, and at the other end to receive sliding jaws 47, (see Figs. 3, 9, 10, 11,) which are held and guided in the recesses by ribs 8, which enter grooves in the upper and lower sides of the jaws. The jaws 47 are forked at their inner ends, as shown, so as to partially embrace the ends 15 of the axle, and are provided upon their outer faces with oblique converging dovetailed grooves 6, into which fit correspondingly-shaped ribs 5, formed on overlapping projections 16, extending from a pair of jaws, 46, which lie in the recesses 48, and are arranged to move toward each other along the inclined forks of the jaws 47. The jaws 46 are so formed, as will be observed, that as they approach each other they act to partially embrace the ends 15 of the axle on the sides opposite to the jaws 47. The blocks 49 are provided with screw-rods 45, which pass through openings in the jaws 46 and enter the jaws 47. The operation of these chucks is as follows: The ends 15 of the axle 98 having been entered into the recesses 48 the screw-rods 45 will be operated so as to draw the jaws 47 inward and cause their forked ends to partially embrace one side of the ends 15 of the axle. As this is done the jaws 46 will be forced toward each other along the inclines of the forks of the jaws 47, so as to partially embrace the ends 15 of the axle on the opposite side, and thus the jaws 47 46 will together grasp and center and hold the ends of the axle firmly in the chucks, so as to prevent it from being moved in any direction. They will not, however, grasp it so firmly as to prevent it and the wheels 97 from being revolved freely, so as to bring all portions of the circumference of the wheels into position to be acted on by the disks 99. The recesses 6 are provided with springs 7, which act upon the ribs 5 of the jaws 46, so as to move the jaws from each other when the rods 45 are operated in the reverse direction, and thus allow the ends of the axle to be readily removed from the chucks.

The proper rotation of the wheels 97 and axle 98 is effected as follows: The shaft 90 is provided with a small pulley, 60, which is connected by a belt, 61, with a pulley, 62, upon a small shaft, 63, which is supported in bearings in the ends of cross-pieces 92, secured to one of the tie-beams, $b$, of the frame C. The shaft 63 is also provided with a number of pulleys, 59, of varying sizes, one of which is connected (it may be any one of the number, depending upon the speed at which it is desired that the wheels 97 should be revolved)

by a belt, 24, with the corresponding one of a series of different-sized pulleys, 58, upon a shaft, 64, which is mounted in the opposite ends of the cross-pieces 92. The shaft 64 is also provided with two pulleys, 57, which are connected by belts 56 with pulleys 55 upon the ends of a pair of shafts, 65, which turn in sleeves 66, and are provided at their ends with worms 54, which engage with worm-wheels 53 upon short shafts 67, which are also provided with friction-wheels 52, which bear upon the treads of the car-wheels 97. The shafts 67 are supported in the ends of arms 68, which extend from a rock-shaft, 69, which in turn is supported in bearings on the tie-beam $d$. The sleeves 66, through which the shafts 65 pass, are supported at their outer ends by bearings 51, which surround the shafts 67, and at their inner ends by rods 71, extending from the tie-beam $d$. The arms 68 are rocked so as to hold the wheels 52 in constant engagement with the treads of the car-wheels 97 by means of springs 72, which are interposed between ears 50, projecting from the arms 68, and a plate, 73, which is provided with an adjusting-screw, 74, by which it can be raised and lowered to vary the tension of the springs and cause them to hold the wheels 52 against the car-wheels with any desired amount of pressure. The tie-beam $b$, above the wheels 97, is provided with a number of pivoted dogs or stops, 25, which rest upon one or both of the wheels in such position, as shown, as to prevent the wheels from being turned, except in the proper direction. The movable frame or carriage C, which supports the wheels 97, and the apparatus for revolving them to present all portions of their treads and flanges to the disks 99, is provided with means by which it can be adjusted to and from the disks 99, so that the wheels 97 may be moved up to the disk as the dressing progresses, and also with means by which it can be adjusted longitudinally, so that after the wheels 97 and axle 98 have been suspended in the chucks D the whole can be adjusted so as to bring the wheels exactly opposite the disks. For this purpose the bearings 88 are provided with movable blocks $h$, which are interposed between the bearings and the pieces $c$, and are provided upon their under sides with dovetailed grooves which receive correspondingly-shaped ribs, 75, formed on the tops of the bearings, and upon their upper sides with similar grooves arranged at right angles to those upon their under sides which receive correspondingly-shaped ribs 76, secured to studs 93, which enter the pieces $c$. The adjustment of the frame C to and from the disks 99 is effected by means of screw-rods 40, (see Figs. 5 and 6,) which are held in the ribs 75 and work in nuts 39, formed on the under sides of the blocks $h$. The adjustment of the frame C longitudinally is effected by means of screw-rods 38, which are held in the ribs 76, and work in nuts 37, formed on the upper sides of the blocks $h$. The ends of the rods 38 40 are formed to receive a ratchet or other suitable form of wrench, as 87, by which the rods can be conveniently operated.

The operation of the mechanism thus organized is as follows: The axle 98, carrying the wheels 97, having had its ends centered and secured in the chucks D, the frame C will, if necessary, be adjusted longitudinally by the screw-rods 38 until the wheels 97 are in exactly the proper position opposite the disks 99. The screw-rod 74 will also be operated, if necessary, so as to cause the friction-wheels 52 to bear against the treads of the wheels 97 with considerable pressure. The shaft 90, carrying the disks 99, will then be set in motion in the direction indicated by the arrow, thereby, through the belt 61 and other connections described, setting in motion the friction-wheels 52, and causing the wheels 97 to be revolved slowly in the same direction, as also indicated by the arrow. As soon as the disks 99 have attained a sufficient speed, say, from two thousand five hundred to three thousand revolutions per minute, assuming the disks to be from thirty-five to forty-two inches in diameter, the screw-rods 40 will be operated so as to move the frame C toward the disks until the treads and flanges of the wheels are brought into contact with or into exceedingly close proximity to the peripheries of the disks. As soon as this takes place that portion of the surface of each wheel which is in contact with or in closest proximity to its disk will be burned or melted away, as indicated in Fig. 12, and as the wheels are slowly revolved by the friction-wheels 52, so as to successively present all parts of their peripheries to the disks, the entire surface of the tread and flange of each wheel will be burned and melted away to a uniform depth, thus removing the old or uneven surface and producing a new surface which is perfectly smooth and uniform and of high finish. This will be accomplished, no matter how hard or how soft the metal of which the wheels are composed, or whether it is of iron or steel, without any perceptible wear upon the disks and without imparting any objectionable amount of heat to the disks, and also without heating the wheels to any considerable extent, except at the immediate point which is being acted upon. By continuing the operation and properly operating the screw-rods 40, so as to move the wheels up to the disks as the dressing progresses, the wheels may be dressed down to any desired extent, for the purpose of removing irregularities or of reducing them to the proper diameter. The end frames, B, will preferably be provided with graduated scales, as $g$, (see Fig. 2,) which will serve as guides to the operator in adjusting the frame C, and enable him to keep both ends of the frame in the same position with relation to the disks, so that the two wheels will be dressed exactly alike.

It has been found difficult, owing to the great speed at which the disks 99 are revolved, to keep the bearings of the shaft 90 properly lubricated by ordinary means. To overcome this, the machine is provided with a small force-pump, 94, by which a flow of oil is maintained through the bearings 77 78 of the shaft, so as to keep the bearings constantly lubricated. This pump is operated from a crank-shaft, 41, having a pulley, 42, which is connected by a belt, 43, with a pulley, 44, upon the shaft 63. The suction-pipe 80 of the pump communicates with a supply of oil contained in a trough or tank, E, located at the base of the machine, and the discharge pipe 81 of the pump is provided with branches 79, which communicate with oil-openings at or near the centers of the bearings 78, and with small closed chambers formed by caps 36, which screw onto the outer ends of the bearings 77 and inclose the ends of the shaft 90. The inner ends of the bearings 77 and the outer ends of the bearings 78 are provided with recesses 35, (see Fig. 37,) into which extend disks 34, secured to the shaft 90, and the inner ends of the bearings 78 are provided with caps 33, which fit around the shaft 90, and are held against the ends of the bearings by rods 32, and which form small closed chambers, within which the shaft 90 is provided with circumferential ribs or projections 9, the purpose of which, as well as of the disks 34, will be presently explained. The recesses 35 and the chambers formed by the caps 33 are provided with waste-pipes 82, which discharge into the trough E.

The operation of this lubricating apparatus is as follows: Whenever it is desired to put the lubricating apparatus into operation, the belt 43 will be shifted from the loose pulley 31 to the pulley 42, so as to set the pump 94 in operation. The oil will then be drawn from the trough E through the pipe 80 into the pump, and then forced by the pump through the pipe 81 and its branches 79 to the bearings 77 78. The pump will force the oil into the bearings with such a degree of pressure that it will be caused to find its way through the bearings around the shaft and escape into the recesses 35 and the chambers formed by the caps 33, from which recesses and chambers it will flow back to the trough through the pipes 82. By this means a constant circulation of oil can be maintained through the bearings 77 78. Any leakage of the oil from the bearings is prevented by the disks 34 and ribs 9, which throw the oil away from the shaft by centrifugal force, so that it will all flow into the pipes 82. The discharge-pipe 81 of the pump 94 is provided with a branch, 83, which opens over the trough E, and is provided with an escape-valve, 11, which operates, when the pump forces the oil into the pipe 81 faster than it can circulate through the bearings 77 78, to allow a portion of it to escape and flow directly back into the trough.

It will be observed that the pulleys 62 and 44 are of sufficient width to permit the frame C to have the necessary amount of longitudinal movement without interfering with the proper running of the belts 61 and 43.

In the organization shown in Figs. 13 to 18 only one of the disks 99 is employed, and this disk, instead of being formed so that its periphery is a counterpart of the tread and flange of the car-wheel, is made quite thin at the edge, as shown. The shaft 90, upon which the disk is mounted, is supported in bearings 77 in the upright portions B of the frame, and is provided with pulleys or enlargements 91, for the driving-belts 100. In order to prevent the shaft from springing, so as to cause the disk to wabble, there are three of the driving-belts used, two of which pass in one direction and the third in the opposite or nearly opposite direction, thereby preventing such a strain upon the shaft as would tend to spring it. The upright portions B are provided with flat bearings 88 89, upon which rests a movable frame or carriage, C, which supports the car-wheels and axle during the dressing operation. This frame consists of end pieces, c, which rest upon the bearings 88 89, and are rigidly connected by a web, d. The end pieces, c, of the frame C are provided upon their upper side with bearings 29, in which are mounted ordinary centers 84. The bearings 29 are made adjustable upon the pieces c, as shown, so as to capacitate the machine to operate upon wheels of different sizes. The piece c at the left-hand end of the machine is provided with an upwardly-extending bracket, 85, in which is mounted a vertical shaft, 86, the upper end of which is provided with a belt-pulley, 28, while its lower end is provided with a worm, 17, which engages with a worm-gear, 27, having ordinary centering-jaws 26, by which it is fastened during the dressing operation to the end of the axle 98, upon which the wheel 97 which is being dressed is fixed. The gear 27 is also provided with three or more steadying-bolts, 18, which impinge against the outer face of the wheel, so as to hold the gear steady. The frame C is made adjustable both longitudinally and to and from the disk 99. This is effected as follows: The bearings 88 are provided with recesses 12, in which are located movable blocks h, which are connected together by a rod, 30, and are provided upon their upper faces with obliquely-arranged ribs or guides 75, and upon their under sides with straight ribs or guides 76. The ribs 76 lie in grooves formed in the bottoms of the recesses 12, while the guides 75 lie in oblique grooves formed in the pieces c. The block h at one end of the machine (the right-hand end, as shown) is provided with a projection or lug in which is mounted a screw-rod, 38, which works in a nut formed in the piece c, and the same block is also provided with a projection or lug in which is mounted a screw-rod, 40, which works in a nut formed in the upright portion B. From this construction it will readily be seen that by operating the screw-rod 40 the blocks h, and with them the frame C, can be moved longitudinally in a right line, and that by operating the screw-rod 38 the frame C can be moved obliquely along the ribs 75 of the blocks, and that by operating both of the screw-rods, but in opposite directions, the frame can be moved to and from the disk 99 in a right line.

The operation of the organization just described is as follows: The worm-gear 27, having been placed upon the end of the axle 98 of the pair of wheels which it is desired to dress, and centered and secured thereon by means of the jaws 26, and the bolts 18 having been set up against the face of the wheel so as to steady the gear, the axle 98 will be centered between the centers 84, so as to be held suspended in the frame C, with the worm-gear 27 in engagement with the worm 17. The screw-rods will then be operated so as to bring the frame carrying the axle 98 and wheels 97 to such position that the edge of the disk 99 will extend past the edge of the tread of the wheel, as indicated in Fig. 16, to a point near the line which it is desired shall be the circumference of the wheel after it is dressed. The disk 99 will then be set in motion, and when it has attained the proper speed, hereinbefore stated, the shaft 86 will be set in motion, so as to turn the wheel slowly in the direction indicated by the arrow, and the screw-rods will be operated so as to gradually move the frame C obliquely to the right, and this being continued the entire surface of the tread of the wheel will be presented to the disk and will be burned and melted away, as indicated in Figs. 17 and 18, and with the same results as already stated. One of the pair of wheels 97 having had its tread dressed in this manner, it is only necessary, in order to dress the tread of the other wheel, to remove the axle 98 from between the centers 84, turn it end for end, place the worm-gear 27 upon the opposite end, and again center it, and repeat the operation upon the other wheel. The frame-piece B will preferably be provided with a pointer, as 3, which will be so arranged that as the frame C is moved it will move over a pattern, as 4, carried by the frame C, and thus serve as a guide, which will enable the operator to give the proper movement to the frame C.

It will readily be seen that the mechanisms shown in the present case may be modified considerably without departing from their essential features. In the mechanism shown in Figs. 1 to 12 one of the disks 99 may be omitted; but in such case it will of course be necessary, after one of the pair of wheels has been dressed, to turn the axle end for end to dress the other wheel. If it should be desired to dress only the treads of the wheels, the edge or edges of the disk or disks 99 will be made to form only the counterpart of the tread; or if it should be desired to dress only the flanges of the wheels the disk or disks will be made to form only the counterpart of the flange. It will also be seen that other means than that shown may be provided for revolving the wheels during the dressing operation. It is also to be understood that in the mechanism shown in Figs. 13 to 18 the edge of the disk 99 may be of a greater or less thickness than shown.

By the process which has been described car-wheels and other bodies made of the hardest chilled iron or highly-hardened steel, which cannot be successfully acted on by a cutting-tool, as well as wheels and other bodies made of softer material—such as common cast or wrought iron or soft steel—can be perfectly dressed in a very short time and at a comparatively small expense.

The speed at which the disk or disks 99 must be revolved to produce satisfactory results will of course depend to some extent upon the character of the metal being dressed. With a disk forty-two inches in diameter and revolved at the rate of three thousand revolutions per minute, wheels and other bodies made of the hardest chilled iron can be readily dressed, while softer metals can be dressed by revolving the disk at a somewhat less speed. Better results can, however, be accomplished by revolving the disks at a much higher speed. If the size of the disk is increased, the same result can of course be accomplished with a proportionally less number of revolutions per minute, and vice versa. Whether or not during the dressing any actual contact takes place between the disk and the surface being dressed I am unable to say, as, owing to the very great velocity of the disk and the intense heat and burning that exist at the point where the metal is being removed, it is impossible to make accurate observations; but if any contact does take place between the disk and surface being dressed or the metal being removed, such contact must be very slight, as I have found that after long use the disk shows no perceptible evidence of wear, which would certainly be the case if there was any considerable amount of friction between the disk and the metal being acted upon. I have also found that if the speed of the disk (the disk being forty-two inches in diameter) is reduced to one thousand or fifteen hundred revolutions per minute and the wheel moved up to the disk in the manner already described, the disk and also the wheel will become very highly heated, the disk will wear rapidly away, and no metal, or practically none, will be removed from the wheel, while on the other hand, if the speed of the disk is increased to from two thousand five hundred to three thousand revolutions per minute and the wheel moved up to it in the same manner, the disk will neither be worn nor heated to any considerable extent, while the surplus metal will be rapidly burned and melted off from the surface of the wheel, and the dressing will be accomplished in a rapid and perfect manner, as stated.

The speed at which the wheel or other body should be moved to present its surface to the disk will of course depend upon the speed of the disk, the character of the metal of which the body being dressed is composed, and the depth to which it is desired to dress away the metal. If it is not desired to harden the dressed surface at all or to any considerable extent, the wheel or other body will be moved comparatively slowly—in the case of a car-wheel about three or four revolutions per minute; but if it is desired to harden the dressed surface, as in the case of a steel car-wheel, or to dress a body made of highly-hardened steel without drawing the temper, the wheel or other body will be turned comparatively fast—in the case of a car-wheel, say, about ten or twelve revolutions per minute—and will be moved up to the disk slowly, so that only a very thin dressing will be removed at each turn. This feature of hardening the dressed surface is one of very great importance, as by this means car-wheels and other bodies, which are made of low carbon steel, which cannot be hardened by any of the common processes, can be provided with exceedingly hard wearing-surfaces.

I have thus particularly described the application of my discovery to the dressing and hardening of the treads and flanges of car-wheels, because, as before stated, this is one of the most important and valuable of the uses to which it can be applied, not only for the purpose of dressing new chilled iron wheels before they are put into use, thus making them more uniform and durable, but more particularly for the purpose of dressing and hardening the treads or treads and flanges of steel wheels which are made of low carbon steel that cannot be hardened by any of the common processes, and also for the purpose of re-dressing wheels which have been in use for some time and have become worn out of shape, so as to be worthless, except for old iron, without re-dressing. This latter use is one of particular importance, because heretofore no means has been known by which chilled car-wheels which have been rendered useless by reason of wear could be re-dressed without an expenditure of time and money, which rendered such re-dressing impracticable. It will be seen, however, that my discovery can be applied to the dressing or dressing and hardening of other metal bodies than car-wheels—such, for example, as chilled rolls and cylindrical bodies generally. It will also be seen that my discovery can be applied to the dressing of flat metal bodies, as well as cylindrical bodies, the only difference being that in the case of a flat surface it will be presented to the edge of the revolving disk by being moved in a right line instead of being revolved, and this can be done by a mechanism similar or analogous to that of an ordinary metal planer.

The mechanisms herein shown are shown merely for the purpose of illustrating some of the many ways in which my discovery can be practically and usefully applied. These mechanisms are not herein claimed, as they form the subject-matter of other applications for Letters Patent.

The improved car-wheel having its surface dressed and hardened as herein described is not herein claimed, as that also forms the subject-matter of another application for Letters Patent.

What I claim is—

1. The herein-described method of dressing, planing, turning, smoothing, or removing, for any purpose, the surfaces of metal bodies, which consists in burning and melting the surface away by means of a rapidly-revolving disk, substantially as described.

2. The herein-described method of dressing, planing, turning, smoothing, or removing, for any purpose, the surfaces of metal bodies, which consists in passing the surface to be dressed in close proximity to a rapidly-revolving smooth disk, substantially as described.

3. The herein-described method of dressing, planing, turning, smoothing, or removing, for any purpose, the surfaces of metal bodies, which consists in subjecting the surface to be dressed to the action of a rapidly-revolving smooth disk, substantially as described.

4. The herein-described method of dressing and hardening the surface of metal bodies, which consists in subjecting the surface to be dressed and hardened to the action of a rapidly-revolving smooth disk, substantially as described.

In testimony whereof I have hereunto set my hand in the presence of two subscribing witnesses.

GEORGE W. MILTIMORE.

Witnesses:
JAS. A. HOVEY,
JAS. J. KENNEDY.